INVENTOR.
DONALD J. FAPIANO
BY
Harold R. Woods
HIS ATTORNEY

United States Patent Office 3,550,279
Patented Dec. 29, 1970

3,550,279
WIDTH GAGE FOR PLATE MILL
Donald J. Fapiano, Scotia, N.Y., assignor to General Electric Company, a corporation of New York
Filed Feb. 7, 1969, Ser. No. 797,577
Int. Cl. G01b 7/00
U.S. Cl. 33—143            7 Claims

ABSTRACT OF THE DISCLOSURE

For use in a plate mill, a width gage utilizing converging sideguides. As the sideguides are converging, one sensor is responsive to an overload condition in the drive means for the sideguides while another is responsive to a condition of no sideguide movement. When both conditions exist concurrently for a predetermined period of time, indicating the sideguides are stalled against the slab, a transfer signal is generated which permits the reading of one or more shaft encoders which produce signals indicating sideguide separation; i.e., slab width.

BACKGROUND OF THE INVENTION

A reversing plate mill is a type of rolling mill in which short, thick metal slabs are reduced in thickness and increased in length in a number of forward and reverse passes through a single mill stand. In a typical plate mill, slabs having different metallurgical compositions are rolled in succession to different finished dimensions, making it necessary to have a different set of rolling instructions for each slab. To reduce the chances that a wrong set of rolling instructions might be used, the thickness and the width of each slab may be measured to see that these dimensions are consistent, within certain limits, with slab-identifying data contained in the rolling instructions intended to be used. Once the identity of a slab is confirmed, the actual rolling operation may begin.

The details of the rolling operation vary with the amount of reduction required and the design of mill. Generally, however, the slab is first rolled to what is thought to be the desired width in a series of broadside passes through the mill, after which the slab is turned 90° on a mill turntable. The width of the slab is then measured. If the slab is undersized, it is turned another 90° and its width is increased in one or more additional broadside passes. Once the slab is rolled to a desired width, it is reoriented and rolled to the desired thickness.

To provide a width measurement for the slab identity check prior to the rolling operations and to measure the slab width achieved during broadside rolling operations, a width gage is needed. Although it is true that certain existing gages could perform the required width measuring operations, such gages are not particularly well suited for use in the environment described. Extreme accuracy is not as critical as durability and low cost in this environment sinnce the heat, vibration, and atmospheric pollutants can severely damage existing width gages.

SUMMARY OF THE INVENTION

The present invention fills a need for an inexpensive, simple width gage well suited for use in the rugged environment of a plate mill. The invention utilizes plate mill sideguides which can be moved towards one another by a drive means. The gage includes a first means connected to the drive means for producing one signal indicating that the drive means appears to be overloaded. A second means coupled to at least one of the sideguides monitors the movement of the sideguides and produces another signal at zero speed. When the two signals exist concurrently for a predetermined period of time, a third means produces a signal indicating that the sideguides are stalled against opposite edges of the slab. Following the last-mentioned signal, a fourth means provides a signal representing separation of the sideguides; i.e., the slab width.

DESCRIPTION OF THE DRAWINGS

While the specification concludes with claims particularly pointing out and distictly claiming that which is regarded as the present invention, the details of certain embodiments of the invention may be more readily ascertained from the following detailed description when read in conjunction with the accompanying drawings in which:

DETAILED DESCRIPTION

Figure 1:
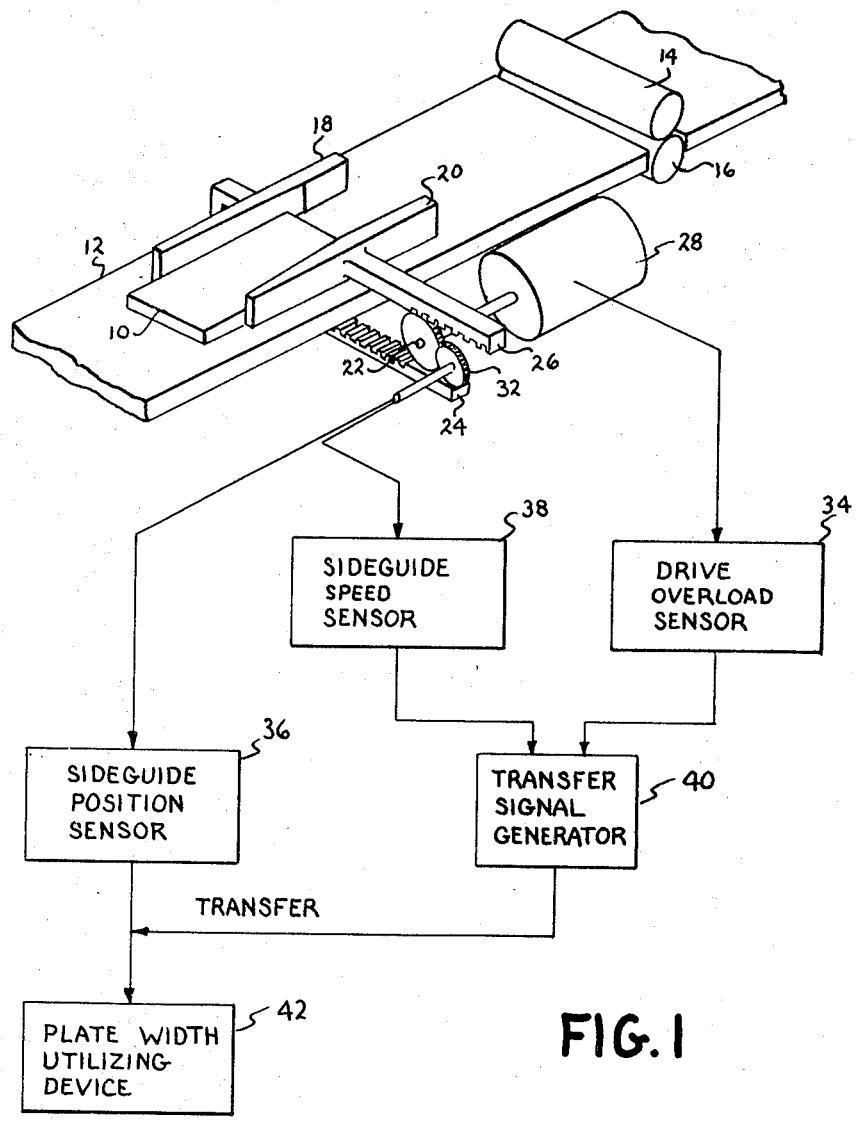
FIG. 1 shows certain physical features of a plate mill in simplified form in combination with a block diagram of a width gage constructed in accordance with the present invention.

Referring now to FIG. 1, a metal slab 10 rests on a rolling table 12 in a plate mill having a mill stand shown only as an opposed pair of rolls 14 and 16. A pair of conventional sideguides 18 and 20 on the rolling table 12 are connected, in a preferred embodiment, to converge in synchronism by means of a gearing arrangement including a pinion gear 22 which meshes with a first rack 24 connected to sideguide 18 and a second rack 26 connected to sideguide 20. Pinion gear 22 is driven by a drive means 28 which preferably includes an electric drive motor and speed reduction gearing. The speed and position of sideguides 18 and 20 are detected by sensors mechanically coupled to the pinion gear 22 through a smaller spur gear 32. A drive overload sensor 34 is connected to the drive means 28 while a sideguide position sensor 36 and a sideguide speed sensor 38 are coupled mechanically to the spur gear 32. Sideguide speed sensor 38 and drive overload sensor 34 are connected to a transfer signal generator 40 which, under certain conditions, generates a transfer pulse to permit the transfer of a position-indicating signal to a utilizing device 42. The devices shown as blocks only may take various forms, particular ones of which are described with reference to FIGS. 2–4.

The above-described gage operates in the following manner. As the slab 10 moves along the rolling table 12 into the area between the sideguides 18 and 20, the sideguides are in their retracted or widely separated positions. After slab 10 is positioned by manual or automatic control of driven rolls (not shown) in the rolling table 12, the drive means 28 is energized manually or automatically depending on the mode of operation of the mill. Automatic control of slab portion can be provided by arrays of hot metal or other such detectors which would track the slab to the proper position.

When drive means 28 begins to rotate pinion gear 22, racks 24 and 26 push sideguides 18 and 20 toward the centerline of the mill. While the sideguides 18 and 20 are converging, the drive overload sensor 34 monitors the condition of the drive means 28 to detect overloading of the drive means. A precise definition of the term overloading depends on the particular construction of the drive means 28. In general, however, overloading can be considered to be a condition during which the load imposed on the drive means exceeds predetermined limits. These limits may be considerably less than the maximum load the drive can tolerate without breakdown. If an overload does occur, sensor 24 produces an enabling signal at one input to transfer signal generator 40. The speed at which the sideguides 18 and 20 are coverging is monitored by speed sensor 38 which produces an enabling signal only when the sideguides are at zero speed.

Since sideguides 18 and 20 are at zero speed before they begin to converge as well as after they are installed and since drive means 28 may be overloaded as it overcomes the inertia of the sideguides or as one of the sideguides begins to center as offcenter slab, it is necessary for the gage to be able to distinguish between these false stall conditions and a true stall condition, wherein both sideguides are in contact with opposite edges of slab 10. The conditions of zero speed and drive overload exist concurrently only briefly as the drive means 28 is first enegized. A time delay unit in the transfer signal generator 40 prevents the initially-generated enabling signals from having any effect by inhibiting any output from generator 40 until both enabling signals have existed for a period of time longer than any reasonable period during which the initially-generated enabling signals could be expected to concurrently exist. After the sideguides begin to move, the conditions of zero speed and drive overload do not exist again concurrently until the sideguides 18 and 20 are stalled against the slab 10, the zero speed enabling signal and the drive overload enabling signal exist concurrently for a period of time which permits the generator 40 to generate a transfer signal.

When the transfer signal is finally generated, the contents of the sideguide position sensor 36, representing the distance between sideguides 18 and 20 and thus the width of the slab 10, are transferred to utilizing device 42 which may, for example, be a mill control computer or a visual display device for use by a mill operator. The generated transfer signal might also be used to initiate a control sequence during which sideguides 18 and 20 are retracted and the sideguide position sensor 36 is reset in preparation for the next width measuring operation.

During the slab identity check and during the width measuring operation following the broadside passes, the expected width of the slab 10 is known quantity which may be utilized, in conjunction with the sideguide position sensor 36, to control the speed at which the sideguides 18 and 20 converge. When the position sensor 36 indicates the sideguides are about to stall against the slab 10, at least according to the expected slab width, motor control circuitry of a conventional nature, may cause the motor speed to be greatly reduced so as to limit mechanical shock or damage to either the slab 10 or the sideguide drive components.

Figure 2:
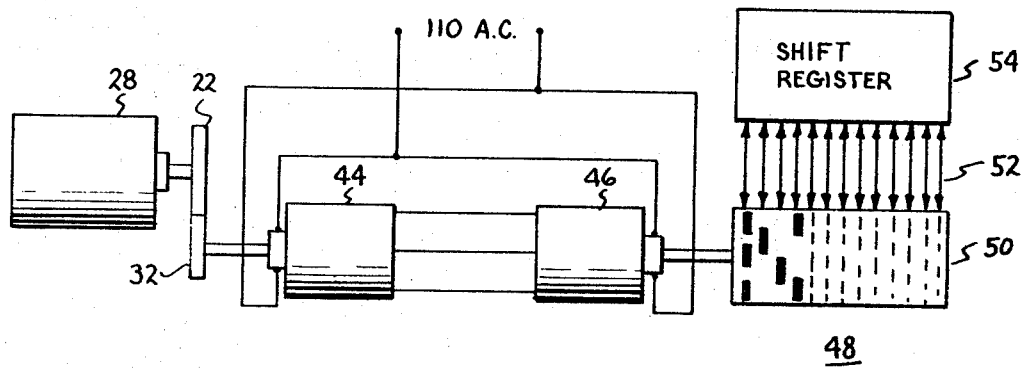
FIG. 2 is a partially schematic diagram of a sideguide position sensor for use with mechanically-linked sideguide.

FIG. 2 shows a preferred form of sideguide position sensor for use in the gage described above. Where certain elements appear in the same form in FIGS. 1 and 2, the numerical designation of those elements remains the same. The sideguide position sensor includes a selsyn transmitter 44 with its rotor mechanically coupled to pinion gear 22 through spur gear 32. As pinion gear 22 rotates, the relative position of the rotor and stator of the selsyn transmitter 44 change causing a torque in a selsyn receiver which tends to bring the receiver rotor into the same relative position with respect to its stator. The selsyn receiver 46, which is a preferred embodiment is located in a mill control room remote from the selsyn transmitter 44, is rigidly coupled to an analog to digital coverter which, in a preferred embodiment, is a shaft encoder 48. Shaft encoder 48 has a cylindrical drum 50 with a number of contacts arranged in parallel rings and in binary code on the surfaces of the drum. A voltage is applied to each parallel ring at a point near a number of reading heads 52. As the angular position of drum 50 is altered by selsyn receiver 46, differing conductive paths are selectively formed between the voltage source (not shown) and the reading heads through the binary-coded contacts. The signals on the reading heads 52 are binary-coded digital signals representing the angular position of drum 50 and, as a consequence, the extent of movement of the sideguides. These signals are applied to a shift register 54 where they are stored until the transfer signal is generated.

The mechanics of transferring the contents of the shift register 54 to the utilizing device 42 are believed to be sufficently well known to make unnecessary a detailed description. The contents of shift register 54 may be made to represent slab width directly by presetting a count representing the original position of the sideguides into the shift register and by then subtracting the count from the shaft encoder 48. Similarly, the contacts on drum 50 of shaft encoder 48 can be arranged to read slab width directly.

In a preferred embodiment, the width gage is periodically calibrated under stall conditions. If the sideguides 18 and 20 can be brought together until they stall against one another, the contents of shift register 54 can be reset to a zero value either manually or, following the generation of a stall signal, automatically. Subsequent changes in the output of shaft encoder 48 may then be used to alter the contents of shift register 54 in direct proportion to the distance of the sideguides from the zero position established under stall conditions. Where the sideguides can not be brought completely together, a reference slab having a known widtht may be used to calibrate the system as described above, the only difference being that the contents of the shift register would be preset to a count representing the known width.

Figure 3:
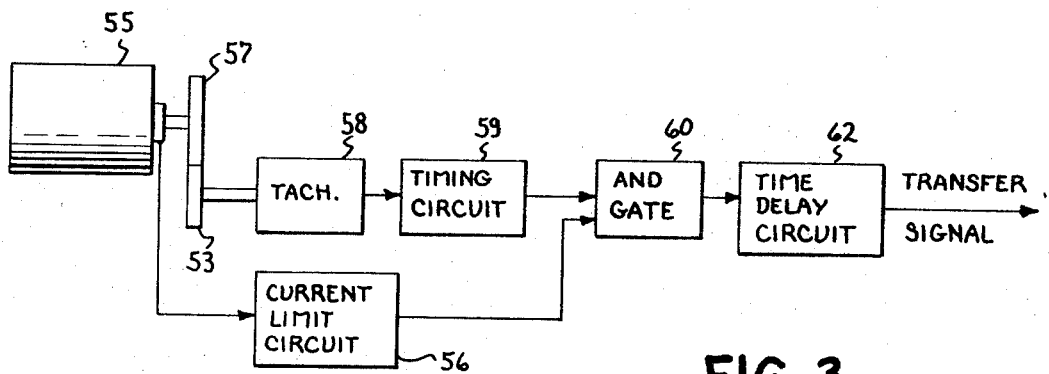
FIG. 3 is a block diagram of a particular embodiment of the transfer signal generating portion of a width gage.

FIG. 3 shows a particular embodiment of a gage to be used where a drive means 55 is coupled directly to at least one of the sideguides through a rack and pinion gearing arrangement, of which only pinion gear 57 is shown. In this embodiment, the drive overload sensor is a current limit circuit 56 which produces an output signal only if the load current through the motor of drive means 55 exceeds a predetermined limit, a condition which may indicate that the motor is being overloaded as the sideguides are forced against opposite sides of a slab. Movement of the sideguides is monitored by a conventional tachometer 58 driven by a spur gear 53 meshing with pinion gear 57. The tachometer output is applied to a timing circuit 59 which produces an enabling signal when tachometer 58 ceases to emit speed-indicating pulses for a predetermined length of time, thereby indicating that the sideguide is motionless. Timing circuit 59 can be any one of several types of well known circuits. For example, circuit 59 might include a unijunction transistor having an emitter-to-base capacitor, a resistor in series with a charging source for the capacitor, and a solid state switching device for short circuiting the capacitor upon the occurrence of each speed-indicating pulse. At zero speed the capacitor voltage would continue to build at a rate determined by the RC time constant until the unijunction transistor is driven into conduction to apply an enabling signal current across a resistor in the transistor's base circuit.

Enabling signals from the current limit circuit 56 and the timing circuit 59 are applied to an AND gate 60 which generates an output signal only as long as the circuits 56 and 59 are generating enabling signals. AND gate 60 is connected to a time delay circuit 62 which generates a transfer signal only if the signal at its input is maintained for a predetermined period of time. As was explained above, the time delay is long enough to eliminate false transfer signals which might otherwise be generated due to the transient conditions of overload and zero speed that may occur concurrently as the sideguides first begin to converge.

Figure 4:
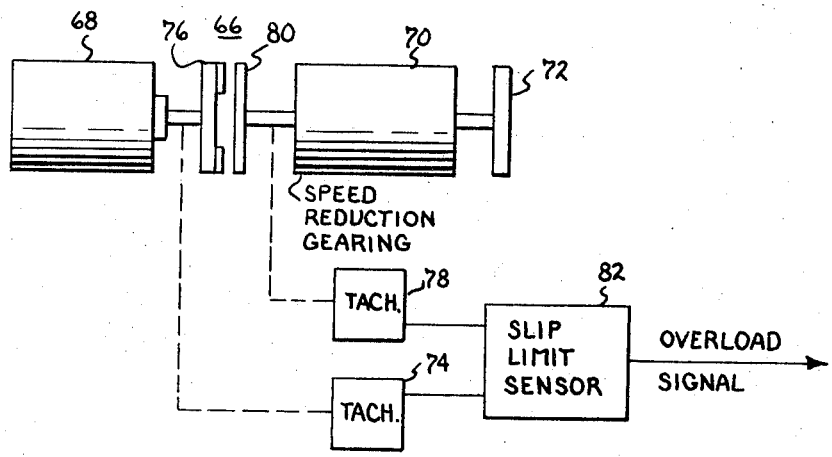
FIG. 4 is a block diagram of an overload sensor for a sideguide train including a friction clutch.

FIG. 4 shows an alternative form of drive overload sensor which may be used in place of the current limit circuit 56 of FIG. 3 when a friction cultch 66 in interposed between a drive motor 68 and speed reduction gearing 70 in the drive means for a pinion gear 72, one component in a rack and pinion gearing arrangement of the type described above. A first tachometer 74 senses the speed of rotation of the one face 76 of clutch 66 while a second tachometer 78 senses the speed of rotation of the other face 80. Under overload conditions, face 80 begins to slip relative to face 76. When the difference in speed of rotation of the two faces reaches a predetermined level, a slip limit sensor 82 generates an overload-indicating signal.

While there has been described what is believed at present to be preferred embodiments of the present invention, it is recognized that variations and modifications of the invention may occur to those skilled in the art. For example, it might be desirable to drive the two sideguides independently, making it necesary to have position, speed, and overload sensors for each sideguide, except where the sideguide drives are electrically synchronized. As a further example, the shaft encoder shown in FIG. 2 might be replaced by a solid state analog to digital converter. These and other such changes would occur readily to one familiar with the basic concepts of the invention. Therefore, it is intended that the appended claims shall be construed to include all such variations and modifications as fall within the true spirit and scope of the invention.

What is claimed is:

1. A width gage for use in a plate mill including a pair of sideguides with drive means for moving the sideguides toward one another and means for utilizing the width measurement, said gage including:
   (a) a first means connected to the drive means for producing a signal indicating an overload condition;
   (b) a second means connected to at least one of the sideguides for producing a signal indicating the sideguide is not moving;
   (c) a third means responsive to the concurrent existence of signals from said first means and said second means over a predetermined period of time for generating a transfer signal; and
   (d) a fourth means for measuring the separation of the sideguides and for transferring the measurement to the utilizing means in response to the transfer signal.

2. A width gage for use in a plate mill having means for utilizing the width measurement and a pair of sideguides with a drive motor and a gearing arrangement for moving the sideguides toward one another, said width gage including:
   (a) a load-responsive circuit connected to the drive motor for producing a signal indicating a motor overload;
   (b) a speed-responsive circuit connected to at least one of the sideguides for producing a signal indicating the sideguide is not moving;
   (c) a transfer signal generator responsive to the concurrent existence of the signals from said load responsive circuit and said speed-responsive circuit over a predetermined period of time for generating a transfer signal; and
   (d) a position sensor connected to at least one of the sideguides for measuring the separation of the sideguides, said position sensor being responsive to the transfer signal to transfer a separation-indicating signal to the utilizing means.

3. A width gage of the type recited in claim 1 wherein said fourth means comprises:
   (a) An analog to digital converter;
   (b) a selsyn transmitter having its rotor connected for rotational movement directly proportional to the linear movement of the sideguides;
   (c) a selsyn receiver having its stator electrically connected to the stator of said transmitter and its rotor connected to said analog to digital converter; and
   (d) a shift register for storing the signal produced by said converter, said shift register being connected to said third means to respond to a transfer signal to transfer its contents to the utilizing means.

4. A width gage of the type recited in claim 2 wherein said position sensor includes:
   (a) an analog to digital converter;
   (b) a selsyn transmitter having its rotor connected to the gearing arrangement for rotational movement directly proportional to the linear movement of the sideguides;
   (c) a selsyn receiver having its stator electrically connected to the stator of said transmitter and its rotor connected to said analog to digital converter; and
   (d) a shift register for storing the signal produced by said converter, said shift register being connected to said transfer signal generator to respond to a transfer signal to transfer its contents to the utilizing means.

5. In a width gage of the type recited in claim 2 wherein a friction clutch is interposed between the drive motor and the gearing arrangement, a load-responsive circuit as recited further comprising:
   (a) a first speed-responsive means for measuring the speed of rotation of one face of the clutch;
   (b) a second speed-responsive means for measuring the speed of rotation of the other face of the clutch; and
   (c) means for comparing speed-indicating signals produced by said first speed-responsive means and said second speed-responsive means, said last named means being responsive to a predetermined difference in speeds to produce an overload-indicating signal.

6. In a width gage of the type recited in claim 2, a load-responsive circuit comprising a current-limit circuit for producing an overload-indicating signal when the load current through the drive motor exceeds a predetermined limit.

7. A method of measuring the width of a plate being rolled in a plate mill having sideguides with drive means for causing the sideguides to converge, said method including the steps of:
   (a) sensing the load imposed on the drive means to detect an overload condition;
   (b) sensing the speed at which the sideguides are converging to detect a condition of zero speed;
   (c) generating a transfer signal when the conditions of drive means overload and sideguide zero speed have been sensed concurrently over a predetermined period of time; and
   (d) establishing the separation of the sideguides at the time the transfer signal is generated.

References Cited
UNITED STATES PATENTS

| | | | |
|---|---|---|---|
| 2,514,847 | 7/1950 | Coroniti et al. | 33—147(N) |
| 3,270,329 | 8/1966 | Schnell | 33—143(L) |

SAMUEL S. MATTHEWS, Primary Examiner